United States Patent
Friegel et al.

(10) Patent No.: US 11,981,217 B2
(45) Date of Patent: May 14, 2024

(54) SYSTEM FOR A DRIVE ENERGY STORE OF A HYBRID OR ELECTRIC VEHICLE, AND METHOD FOR CHARGING A DRIVE ENERGY STORE OF A HYBRID OR ELECTRIC VEHICLE

(71) Applicant: Bayerische Motoren Werke Aktiengesellschaft, Munich (DE)

(72) Inventors: Armin Friegel, Munich (DE); Robert Lustig, Munich (DE); Bernhard Sessner, Munich (DE); Hubertus Welsch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 535 days.

(21) Appl. No.: 17/272,995

(22) PCT Filed: Oct. 2, 2019

(86) PCT No.: PCT/EP2019/076668
§ 371 (c)(1),
(2) Date: Mar. 3, 2021

(87) PCT Pub. No.: WO2020/088872
PCT Pub. Date: May 7, 2020

(65) Prior Publication Data
US 2021/0323411 A1 Oct. 21, 2021

(30) Foreign Application Priority Data
Oct. 30, 2018 (DE) ...................... 10 2018 127 053.4

(51) Int. Cl.
*B60L 3/00* (2019.01)
*B60L 53/00* (2019.01)
(Continued)

(52) U.S. Cl.
CPC ............. *B60L 3/0046* (2013.01); *B60L 53/00* (2019.02); *B60L 58/13* (2019.02); *B60L 58/15* (2019.02);
(Continued)

(58) Field of Classification Search
USPC ........................................................ 320/109
See application file for complete search history.

(56) References Cited

U.S. PATENT DOCUMENTS

| 6,255,803 B1 | 7/2001 | Ishihara et al. |
| 2006/0208708 A1 | 9/2006 | Ishishita |

(Continued)

FOREIGN PATENT DOCUMENTS

| CN | 101112897 A | 1/2008 |
| CN | 102897052 A | 1/2013 |

(Continued)

OTHER PUBLICATIONS

International Search Report (PCT/ISA/210) issued in PCT Application No. PCT/EP2019/076668 dated Feb. 3, 2020 with English translation (four (4) pages).

(Continued)

*Primary Examiner* — Bryce M Aisaka
(74) *Attorney, Agent, or Firm* — Crowell & Moring LLP

(57) ABSTRACT

A system for a drive energy store of a hybrid or electric vehicle is provided. The system includes a receiver which is designed to receive state information of the drive energy store, the state information specifying whether a defect is present or imminent in the drive energy store; and a charging controller, which is designed to adjust a maximum charging voltage and/or a maximum state of charge for a charging process of the drive energy store by a recovery mechanism (Continued)

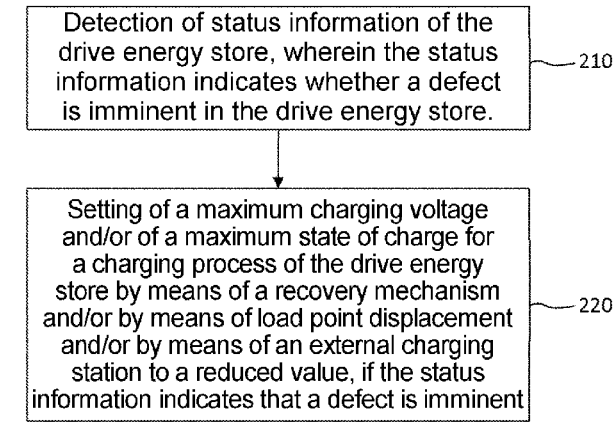

and/or a load point shift and/or an external charging station to a reduced value if the state information indicates that the defect is imminent.

13 Claims, 1 Drawing Sheet

(51) Int. Cl.
    *B60L 58/13*    (2019.01)
    *B60L 58/15*    (2019.01)
    *H01M 10/48*    (2006.01)

(52) U.S. Cl.
    CPC ....... *H01M 10/48* (2013.01); *B60L 2240/545* (2013.01); *B60L 2240/547* (2013.01); *B60L 2240/549* (2013.01); *B60L 2250/16* (2013.01); *B60Y 2200/91* (2013.01); *B60Y 2200/92* (2013.01)

(56) References Cited

U.S. PATENT DOCUMENTS

| | | |
|---|---|---|
| 2008/0042615 A1 | 2/2008 | Serrels et al. |
| 2010/0033135 A1 | 2/2010 | Nishida et al. |
| 2013/0027048 A1 | 1/2013 | Schwarz et al. |
| 2013/0314050 A1 | 11/2013 | Matsubara et al. |
| 2014/0117942 A1 | 5/2014 | Fisher |
| 2016/0221465 A1* | 8/2016 | Kratzer ................. H02J 7/0013 |
| 2018/0222309 A1* | 8/2018 | Follen ................... B60W 20/30 |
| 2019/0001959 A1 | 1/2019 | Schlumpp et al. |

FOREIGN PATENT DOCUMENTS

| | | |
|---|---|---|
| CN | 103457003 A | 12/2013 |
| CN | 103730702 A | 4/2014 |
| CN | 105842626 A | 8/2016 |
| CN | 108521155 A | 9/2018 |
| CN | 108698607 A | 10/2018 |
| DE | 10 2006 000 086 A1 | 9/2006 |
| JP | 9-74610 A | 3/1997 |

OTHER PUBLICATIONS

German-language Written Opinion (PCT/ISA/237) issued in PCT Application No. PCT/EP2019/076668 dated Feb. 3, 2020 (eight (8) pages).

German-language Search Report issued in German Application No. 10 2018 127 053.4 dated Aug. 29, 2019 with partial English translation (12 pages).

Chinese-language Office Action issued in Chinese Application No. 201980051065.X dated May 12, 2023 with English translation (16 pages).

* cited by examiner

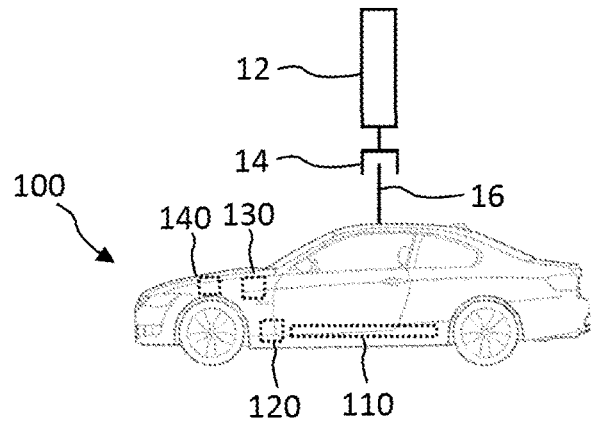

Detection of status information of the drive energy store, wherein the status information indicates whether a defect is imminent in the drive energy store. — 210

Setting of a maximum charging voltage and/or of a maximum state of charge for a charging process of the drive energy store by means of a recovery mechanism and/or by means of load point displacement and/or by means of an external charging station to a reduced value, if the status information indicates that a defect is imminent — 220

Fig. 2

SYSTEM FOR A DRIVE ENERGY STORE OF A HYBRID OR ELECTRIC VEHICLE, AND METHOD FOR CHARGING A DRIVE ENERGY STORE OF A HYBRID OR ELECTRIC VEHICLE

BACKGROUND AND SUMMARY OF THE INVENTION

The disclosure relates to a system for a drive energy store of a hybrid or electric vehicle, to a hybrid or electric vehicle having a system of this type, and to a method for charging a drive energy store of a hybrid or electric vehicle. The present disclosure particularly relates to the prevention of a short-circuit in the drive energy store, and particularly in cells of a lithium-ion battery.

PRIOR ART

Hybrid or electric vehicles are driven by an electric motor, wherein the requisite electrical energy, for example, is stored in a high-voltage store, which can be charged using a domestic charging station, or at a special fueling station. The high-voltage store can comprise a plurality of battery cells, which are connected in series and/or in parallel. During the production of the high-voltage store, impurities can occur in the battery cells. In particular, foreign particles can be incorporated, with a consequent impairment of (internal or external) cell insulation. This can result in an insidious loss of charge, or even in internal short-circuits.

For the detection of impending cell defects, a symptomatic diagnosis can be employed, for example, with respect to an increased spontaneous discharge. On the basis thereof, a service operation can be executed such as, for example, a replacement of the cell module concerned. However, the cell defect can occur prior to the replacement of the cell module, potentially resulting in overall damage to the high-voltage store. Moreover, the cell defect, depending upon the state of charge and the energy density, can pose a risk of fire.

DISCLOSURE OF THE INVENTION

The object of the present disclosure is the disclosure of a system for a drive energy store of a hybrid or electric vehicle, a hybrid or electric vehicle having a system of this type, and a method for charging a drive energy store of a hybrid or electric vehicle, which can prevent a defect. In particular, the object of the present disclosure is the prevention of a short-circuit in individual cells of the drive energy store, thereby improving the safety of the drive energy store.

This object is fulfilled by the subject matter of the independent claims. Advantageous configurations are disclosed in the sub-claims.

According to one independent aspect of the present disclosure, a system for a drive energy store of a hybrid or electric vehicle is disclosed. The system comprises a receiving device, which is designed to receive status information for the drive energy store, wherein the status information indicates whether a defect in the drive energy store is imminent, and a charging control device (or a charging control and energy management device) which is designed to set a maximum charging voltage and/or a maximum state of charge (SoC) for a charging process of the drive energy store to a reduced value, when the status information indicates that a defect is imminent. The maximum charging voltage and the maximum state of charge provide upper limiting values, which define how much further the drive energy store can, or should be charged. The charging process can, for example, be executed by means of a recovery mechanism and/or a load point displacement and/or an external charging station.

According to the invention, reduced values for the maximum charging voltage and/or the maximum SoC are employed, if it is established that a cell defect is imminent. A preventative measure in response to a detected risk of a cell defect is thus provided, which minimizes the risk of a direct defect. The vehicle can continue to operate, without the risk of a direct defect. Availability for the customer is increased, and customer satisfaction is enhanced. Moreover, battery fires associated with the direct cell defect can be prevented.

The drive energy store is preferably a battery, such as, for example, a lithium-ion battery, having a plurality of cells. The cells can be interconnected in parallel and/or in series. Each cell can comprise a positive electrode, a negative electrode, an electrolyte and a separator. The defect can be an internal cell defect such as, for example, a short-circuit in an individual cell caused by a foreign particle.

The charging control device is preferably designed to set the maximum charging voltage and/or the maximum state of charge for the charging process to a normal value which is greater than the reduced value, if the status information indicates that no defect is imminent. In other words, in a normal state, standard values and, in a risk state, reduced values for the maximum charging voltage and/or the maximum state of charge, in comparison with the standard values, can be employed. The drive energy store and the vehicle can thus be operated with increased safety, even in the event of an impending cell defect.

Typically, the reduced value of the maximum charging voltage and/or of the maximum state of charge is a finite value, i.e., greater than zero. In some embodiments, the reduced value of the maximum charging voltage and/or of the maximum state of charge can be essentially zero. Thus, for example, a full discharge of the cell or of the drive energy store can be executed.

The normal value of the maximum charging voltage preferably lies within a range of 2.8 volts to 4.2 volts. In the present example, the maximum charging voltage describes a charging voltage of an individual cell of the drive energy store. The reduced value of the maximum charging voltage per cell can lie within a range of 3 to 4 volts, and particularly within a range of 3.5 to 3.7 volts. For example, the reduced value of the maximum charging voltage per cell can be 3.616 volts.

The charging control device is preferably further designed to adjust the maximum state of charge (SoC) from a first value (e.g., a normal value) to a second value (i.e., the reduced value), which is less than the first value, if the status information indicates that a defect is imminent. The first value can be, for example, 90% or more of a maximum possible charge of the drive energy store. Additionally or alternatively, the second value can be less than 90% of the maximum possible charge of the drive energy store. The drive energy store, in the event of an impending cell defect, independently of any instruction by the user, is thus charged to a lesser extent than under normal circumstances. An internal pressure in the battery cells can thus be reduced, and a short-circuit prevented accordingly.

The normal value of the maximum state of charge can correspond, for example, to a predefined "full charge" of the drive energy store. In standard operation, however, lithium-ion batteries, for example, are not charged to their physical maximum (i.e., up to 100%), as the charging time for the final few percent increases substantially. The normal value of the maximum state of charge can nevertheless correspond to the full charge, even when this value is less than 100% of the physical maximum.

The charging control device is preferably further designed to discharge the drive energy store, by means of one or more electrical loads of the vehicle, when the status information indicates that a defect is imminent. In particular, the drive energy store, in the event of a detection of an impending defect, can be discharged such that an actual charging voltage and/or an actual state of charge lies below the reduced values of the maximum charging voltage or of the maximum state of charge, or is reduced thereto. In some forms of embodiment, the reduced value of the maximum charging voltage and/or of the maximum state of charge, in a highly critical situation, can essentially be zero, such that a full discharge of the cell or of the drive energy store is executed.

The one or more electrical loads can comprise an electric motor of the vehicle (i.e., the traction motor) and/or in-vehicle electrical loads such as, for example, an on-board electronic system, an air-conditioning installation, etc. Accordingly, no additional discharging means are required for the discharging of the drive energy store to the reduced operating range. In some forms of embodiment, in a hybrid vehicle, a discharging of the drive energy store in the event of a detection of an impending defect, in the reduced operating range, can be executed by means of a load point displacement, and particularly by a load point reduction.

The charging control device is preferably further designed to set a maximum charging power for the charging process of the drive energy store by means of the recovery mechanism and/or by means of the load point displacement and/or by means of the external charging station to a value which is reduced, in comparison with normal circumstances (i.e., in the absence of an imminent defect), if the status information indicates that a defect is imminent. If, for example, the reduced maximum charging voltage and/or the reduced maximum state of charge (SoC) are exceeded at a time point at which the impending defect has been detected, no further charging power is released, e.g., for the recovery, and the drive energy store is not charged.

The system preferably comprises an output device, which is designed for the outputting of information concerning the impending defect to a user. In particular, an instruction can be issued to the user to the effect that a workshop should be contacted, for example for the replacement of the risk-affected cell or a cell module. The instruction can be delivered visually, for example, on a display. The cell or the cell module can thus be replaced, before the defect occurs. Overall damage to the drive energy store can thus be prevented.

In some embodiments, the output device is further designed, e.g., to indicate a maximum potential range, which is reduced by the restriction of the charging voltage. The user can thus be notified of the reduced range, for example, for the purposes of customized route planning. This can also be executed when, for example, although more energy is available, no more than a specific charge can be achieved in the next charging process, on the grounds of the restriction of the charging voltage.

The system preferably comprises a monitoring device, which is designed to monitor a state of the drive energy store, and particularly of a plurality of cells of the drive energy store, and to deliver status information. The monitoring device, for example, can be implemented by means of an appropriate software, using devices which are already present in the vehicle. In other words, in some forms of embodiment, it may not be necessary to incorporate additional actuators or sensors in the vehicle.

The monitoring device can monitor, for example, a cell voltage and/or a current flowing through the cell and/or a cell temperature (e.g., an internal cell temperature and/or an external cell temperature) and/or an internal cell pressure. In some forms of embodiment, an impending cell defect can be deduced from a variation in the cell voltage such as, for example, the open-circuit cell voltage, over a given period of time. In other words, a spontaneous discharge of the drive energy store can be detected, and the imminence of an internal battery short-circuit concluded therefrom.

Additionally or alternatively, the monitoring device can comprise an (e.g., existing) sensor system for detecting an insulation resistance of the battery system (battery cells+sensor system+electronics+cooler, etc.) and/or for detecting the fullness level of the coolant circuit of the vehicle. By means of this sensor system, a further potential critical defect can be detected, such as, for example, a leak in the battery cooler. A defect of this type can result in an internal loss of insulation in the battery system, which can also result in an internal short-circuit. Preventative measures can be executed as described above, in order to prevent the short-circuit (e.g., discharging and the restriction of the maximum charging voltage and/or of the maximum SoC).

According to a further independent aspect of the present disclosure, a hybrid or electric vehicle is disclosed. The hybrid or electric vehicle comprises the system for a drive energy store described in the present document, together with the drive energy store.

The hybrid or electric vehicle can comprise the recovery mechanism, which is designed to charge the drive energy store during travel, by means of energy recovery. The recovery mechanism can comprise or constitute, for example, a regenerative brake.

According to the embodiments, the hybrid or electric vehicle can be an exclusively electric vehicle (BEV) or a plug-in hybrid vehicle (PHEV). The term "vehicle" includes private cars, HGVs, buses, camper vans, motorcycles, etc., which are employed for the conveyance of persons, goods, etc. In particular, the term encompasses motor vehicles for the conveyance of persons.

The hybrid vehicle can comprise a mechanism for load point displacement. A load point displacement can be implemented in the form of a load point increase or a load point reduction. In the case of a load point increase, the combustion engine generates a torque which exceeds the driver command torque, wherein the electric motor offsets the difference by operation in generator mode, such that the sum of the torques of the combustion engine and the electric motor corresponds to the driver command torque, and the drive energy store is charged by means of fuel energy. In the case of a load point reduction, the combustion engine delivers a torque which is lower than the driver command torque, wherein the electric motor offsets the difference by operation in a motor mode, such that the sum of the torques of the combustion engine and the electric motor corresponds to the driver command torque. By the operation of the electric motor in a motor mode, the drive energy store is discharged.

According to a further independent aspect of the present disclosure, a method is disclosed for charging a drive energy store of a hybrid or electric vehicle. The method comprises a detection of status information of the drive energy store, wherein the status information indicates whether a defect is imminent in the drive energy store, and a maximum charging voltage and/or a maximum state of charge for a charging process of the drive energy store is set to a reduced value, if the status information indicates that a defect is imminent. The charging process can be executed, for example, by means of a recovery mechanism and/or by means of a load point displacement and/or by means of an external charging station.

The method can implement the aspects of the system described in the present document for a drive energy store of a hybrid or electric vehicle. Moreover, the system can implement the aspects of the method described in the present document for charging a drive energy store of a hybrid or electric vehicle.

According to a further aspect, a software (SW) program is described. The SW program can be designed to run on a processor, and thus to execute the method described in the present document.

According to a further aspect, a storage medium is described. The storage medium can contain a SW program, which is designed to run on a processor, and thus to execute the method described in the present document.

BRIEF DESCRIPTION OF THE DRAWINGS

Exemplary embodiments of the disclosure are represented in the figures, and are described in greater detail hereinafter. In the figures:

FIG. 1 shows a system for a drive energy store of a hybrid or electric vehicle, according to embodiments of the present disclosure, and FIG. 2 shows a flow diagram of a method for charging a drive energy store of a hybrid or electric vehicle, according to embodiments of the present disclosure.

DETAILED DESCRIPTION OF THE DRAWINGS

Hereinafter, unless indicated otherwise, the same reference symbols are employed for identical or identically functioning elements.

FIG. 1 shows a system for a drive energy store 110 of a hybrid or electric vehicle 100 according to embodiments of the present disclosure. Depending upon the embodiment, the hybrid or electric vehicle 100 can be an exclusively electric vehicle (BEV) or a plug-in hybrid vehicle (PHEV).

The system comprises a receiving device 120, which is designed to receive status information for the drive energy store 110. The status information indicates whether a defect in the drive energy store 110 is imminent.

The defect can be a short-circuit between the electrodes of a cell of the drive energy store 110, associated with a foreign particle. The drive energy store 110 can be, for example, a lithium-ion battery having a plurality of cells.

Status information can be detected by means of a monitoring device. The monitoring device can monitor a plurality of cells of the drive energy store, and determine the status thereof. The monitoring device can be designed, for example, to detect a cell voltage and/or a current flowing through the cell and/or a cell temperature (e.g., an internal cell temperature and/or an external cell temperature) and/or an internal cell pressure. In some forms of embodiment, at least one of the above-mentioned variables can be detected over a period of time. The status of the cell can be deduced from variations over said period of time.

For example, an open-circuit cell voltage can be measured during a stoppage of the vehicle. The status of the cell can be concluded from a variation in the open-circuit cell voltage. If, for example, a decline in the open-circuit cell voltage over a predefined time period exceeds a predefined threshold value, it can be concluded that a cell defect is potentially imminent.

Additionally or alternatively, the monitoring device can comprise a sensor system for the detection of an insulation resistance of the battery system (e.g., battery cells and/or the sensor system and/or electronics and/or coolers, etc.) and/or for the detection of a fullness level in the coolant circuit of the vehicle. By means of this sensor system, a leak in the battery cooler can be detected, which can also result in a cell defect, and particularly in a short-circuit.

The system further comprises a charging control device 130, which is designed to set a maximum charging voltage and/or a maximum state of charge for a charging process of the drive energy store 100, for example, by means of a recovery mechanism 140, to a reduced value, if the status information indicates that a defect is imminent. The term "reduced value" signifies that the value is lower, in comparison with values which are employed in a normal situation, i.e., in the absence of an impending cell defect.

The receiving device 120 and the charging control device 130 can be embodied in a combined software and/or hardware module. Alternatively, the receiving device 120 and the charging control device 130 can be embodied in separate software and/or hardware modules.

In some embodiments, the charging control device 130 can be designed to set the value of the maximum charging voltage and/or of the maximum state of charge for a charging process of the drive energy store 110 to a normal value, which is greater than the reduced value, if the status information indicates that no defect is imminent. Thus, in a normal state, standard values and, in a risk state, reduced values in comparison with the standard values can be employed for the maximum charging voltage and/or the maximum state of charge.

Typically, the normal value for the maximum charging voltage lies within a range of 2.8 volts to 4.2 volts. The reduced value of the maximum charging voltage per cell can lie within the range of 3 to 4 volts, and particularly within the range of 3.5 to 3.7 volts. For example, the reduced value of the maximum charging voltage per cell can be 3.616 volts. In this example, the charging voltage defines a cell voltage which is generated by an individual cell. In particular, the cell voltage can be an open-circuit cell voltage. This voltage is higher, the higher the state of charge of the cell. In other words, the charging voltage correlates to the state of charge.

The charging control device 130 can further be designed to adjust the maximum state of charge (SoC) from a first value (e.g., a standard value) to a second value, which is lower than the first value, if the status information indicates that a defect is imminent. The first value can be, for example, 90% or more of a maximum charge of the drive energy store 110. For example, in standard operation, lithium-ion batteries are not fully charged (i.e., charged to 100%), as the charging time for the final few percent increases substantially. Additionally or alternatively, the second value can be lower than 90% of the maximum charge of the drive energy store 110.

The charging control device 130 can further be designed to discharge the drive energy store 110 by means of one or more electrical loads of the vehicle 100, when the status information indicates that a defect is imminent. This can particularly occur if an actual charging voltage and/or an actual state of charge, at the time of detection of the impending defect, exceeds the reduced values of the maximum charging voltage or the maximum state of charge. In such a case, the drive energy store can be actively discharged, in order to restore the charging voltage and/or the state of charge to a safe range.

The vehicle 100 can be, for example, a hybrid vehicle having a mechanism for load point displacement. Load point displacement can be employed for the active and prompt discharging of the drive energy store 110, in the event of the detection of an impending defect.

In some embodiments, the charging control device 130 is designed to set the maximum charging voltage and/or the maximum state of charge for a charging process of the drive energy store by means of an external charging station to the reduced value, if the status information indicates that a defect is imminent.

Charging of the drive energy store by means of an external charging station is schematically represented in FIG. 1. The hybrid or electric vehicle 100 can be connected by means of a connecting device, e.g., a charging cable or power cable 16, to a power terminal 14 which is arranged on a charging column 12, e.g., a plug socket. The power terminals or charging columns can be connected by means of a power line to a network connection of a power grid of an electric utility company (not represented).

In some embodiments, communication between the hybrid or electric vehicle 100 and the charging column 12 can be executed wirelessly, for example, by means of WLAN, Bluetooth, infrared, GSM, UMTS or similar. Wired communication, for example, via the charging cable, is also possible.

The system can further comprise an output device for the delivery of a user instruction, for example a display. The user instruction can relate to the impending defect. In particular, an instruction can be issued to the user to the effect that a workshop should be contacted for the replacement of the risk-affected cell or of a cell module with the risk-affected cell. Overall damage to the drive energy store 110 can be prevented accordingly. The output device can further be designed, e.g., to indicate the maximum possible range, which is reduced by the restriction of the charging voltage, for example on the display.

FIG. 2 shows a flow diagram of a method 200 for charging a drive energy store of a hybrid or electric vehicle, according to forms of embodiment of the present disclosure.

The method 200, in block 210, comprises a detection of status information for the drive energy store, wherein the status information indicates whether a defect in the drive energy store is imminent and, in block 220, comprises a setting to a reduced value of a maximum charging voltage and/or of a maximum state of charge for a charging process of the drive energy store by means of a recovery mechanism and/or by means of load point displacement and/or by means of an external charging station, if the status information indicates that a defect is imminent.

The method 200 can be implemented by means of software, which runs on a processor. In particular, a storage medium containing a software program can be provided, which is designed to run on a processor, thus executing the method described in the present document.

For example, an "emergency battery operation" bit can be provided which, for example, is permanently engaged with effect from the first positive diagnosis by the spontaneous discharge diagnostic function. A reset of the emergency battery operation bit, for example, can (only) be executed by a (cell) module replacement.

The emergency battery operation bit triggers the reduction of the maximum charging voltage, in the event of recovery and plug-in charging, such that the maximum SoC can no longer be exceeded, once it has been undershot initially. In some forms of embodiment, the emergency battery operation bit triggers the reduction of the maximum charging power, during recovery, such that no further charging power is released over and above the reduced maximum SoC.

Provided that the current SoC or the current voltage, further to the engagement of emergency battery operation, remains above the reduced limiting value, no fault will occur accordingly, and the vehicle will remain drivable. Immediately the current SoC or the current voltage, further to the engagement of emergency battery operation, undershoots the reduced limiting value, the latter will no longer be exceeded, either by charging or by recovery.

Further to the engagement of emergency battery operation, the vehicle can be charged up to the reduced maximum SoC. Any attempted charging to a SoC which exceeds the reduced maximum SoC can be terminated with no resulting fault, or will not be initiated. Charging power can be reduced, in relation to the normal state.

According to the invention, reduced values are employed for the maximum charging voltage and/or the SoC, if it is established that a cell defect is impending. A preventative measure is thus executed in the event of a detected risk of a cell defect, which minimizes the risk of a direct defect. The vehicle can continue to operate, without the risk of a direct defect. Availability for the customer is increased, and customer satisfaction is enhanced. Moreover, battery fires associated with the direct cell defect can be prevented.

What is claimed is:

1. A system for a drive energy store of a hybrid or electric vehicle, the system comprising:
   a receiver that receives status information for the drive energy store, wherein the status information indicates whether a defect in the drive energy store is imminent; and
   a charging controller that sets at least one of a maximum charging voltage and a maximum state of charge for a charging process of the drive energy store via at least one of a recovery mechanism, a load point displacement, and an external charging station to a reduced value, when the status information indicates that the defect is imminent;
   wherein the charging controller sets the maximum charging voltage for the charging process to a normal value, which is greater than the reduced value, when the status information indicates that no defect is imminent, wherein the normal value of the maximum charging voltage lies within the range of 2.8 volts to 4.2 volts.

2. The system according to claim 1, wherein the charging controller adjusts the maximum state of charge from a normal value to the reduced value, which is lower than the normal value, when the status information indicates that the defect is imminent, wherein the normal value is 90% or more of a maximum possible charge of the drive energy store, and the reduced value is less than 90% of the maximum possible charge.

3. The system according to claim 1, wherein the charging controller discharges the drive energy store, by one or more electrical loads of the vehicle, when the status information indicates that the defect is imminent.

4. The system according to claim 1, further comprising an output device that outputs information concerning at least one of the defect and a reduced maximum possible range for attention of a user.

5. The system according to claim 1, further comprising a monitoring device that monitors a state of the drive energy store and delivers status information.

6. The system according to claim 5, wherein the monitoring device detects one or more of the following variables:
- a cell voltage of cells of the drive energy store,
- a current flowing through the cell of the drive energy store,
- a cell temperature of cells of the drive energy store,
- an internal cell pressure of cells of the drive energy store,
- an insulation resistance of a battery system which comprises the drive energy store, and
- a fullness level of a coolant circuit for the drive energy store.

7. The system according to claim 1, wherein the charging controller adjusts the maximum state of charge from the normal value to the reduced value, which is lower than the normal value, when the status information indicates that the defect is imminent, wherein the normal value is 90% or more of a maximum possible charge of the drive energy store, and the reduced value is less than 90% of the maximum possible charge.

8. The system according to claim 1, wherein the charging controller discharges the drive energy store, by one or more electrical loads of the vehicle, when the status information indicates that the defect is imminent.

9. The system according to claim 1, further comprising an output device that outputs information concerning at least one of the defect and a reduced maximum possible range for attention of a user.

10. The system according to claim 1, further comprising a monitoring device that monitors a state of the drive energy store and to deliver status information.

11. A hybrid or electric vehicle, comprising the system according to claim 1.

12. A method for charging a drive energy store of a hybrid or electric vehicle, the method comprising:
- detecting status information of the drive energy store, wherein the status information indicates whether a defect is imminent in the drive energy store;
- setting at least one of a maximum charging voltage and a maximum state of charge for a charging process of the drive energy store via at least one of a recovery mechanism, a load point displacement, and an external charging station to a reduced value, when the status information indicates that the defect is imminent; and
- setting the maximum charging voltage for the charging process to a normal value, which is greater than the reduced value, when the status information indicates that no defect is imminent, wherein the normal value of the maximum charging voltage lies within the range of 2.8 volts to 4.2 volts.

13. A non-transitory computer-readable medium containing a software program, which when executed by a processor, executes the method according to claim 12.

* * * * *